United States Patent [19]
Klinkman

[11] Patent Number: 5,431,425
[45] Date of Patent: Jul. 11, 1995

[54] RETRACTABLE TRAILER HITCH RECEIVER APPARATUS

[76] Inventor: Frederick L. Klinkman, 6333 Robinson Rd., Cass City, Mich. 48726

[21] Appl. No.: 285,182

[22] Filed: Aug. 3, 1994

[51] Int. Cl.⁶ .............................................. B60D 1/54
[52] U.S. Cl. .................. 280/491.1; 280/491.2
[58] Field of Search ............... 280/491.1, 491.2, 491.3, 280/163, 164, 416.1, 480.1, 482, 491.4, 491.5

[56] References Cited

U.S. PATENT DOCUMENTS

| | | | |
|---|---|---|---|
| 2,309,850 | 2/1943 | Klawitter | 280/491.2 |
| 2,856,204 | 10/1958 | Graham | 280/491.2 |
| 3,717,362 | 2/1973 | Johnson | 280/491.2 |
| 3,734,540 | 5/1973 | Thiermann | 280/482 |
| 5,203,194 | 4/1993 | Marquardt | 280/491.2 |
| 5,213,354 | 5/1993 | Vaughn | 280/491.2 |

FOREIGN PATENT DOCUMENTS

0151099  8/1985  European Pat. Off. .......... 280/491.2

*Primary Examiner*—Margaret A. Focarino
*Assistant Examiner*—Carla Mattix

[57] ABSTRACT

A retractable trailer hitch receiver apparatus comprising a mounting frame formed of a pair of spaced, elongated, rigid and generally horizontal elements; a frame coupling mechanism for coupling the mounting frame beneath a vehicle; a rigid hitch receiver positionable between the elements of the frame and formed of a generally horizontal base leg and a cross leg extended upwards therefrom and with an end of the base leg adapted to be coupled to a trailer hitch; and a securement mechanism having one mode for coupling the base leg of the hitch receiver to the mounting frame for placing the hitch receiver in a retracted stowed configuration such that the base leg of the hitch receiver is generally aligned with the mounting frame and another mode for coupling the cross leg to the mounting frame for placing the hitch receiver in an extended operable configuration for receipt of a trailer hitch.

2 Claims, 3 Drawing Sheets

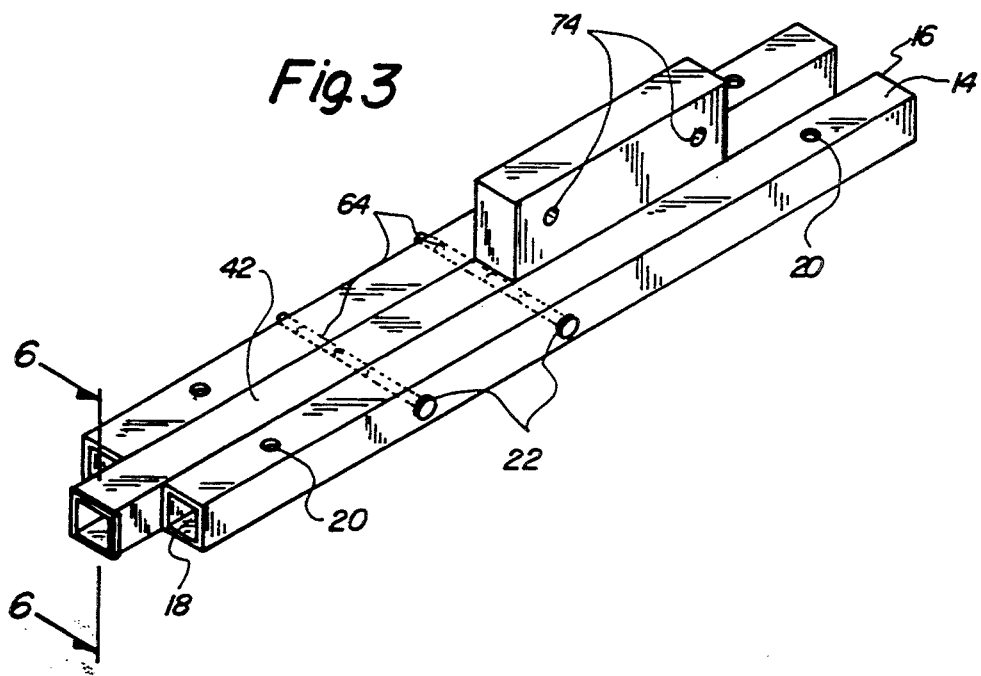
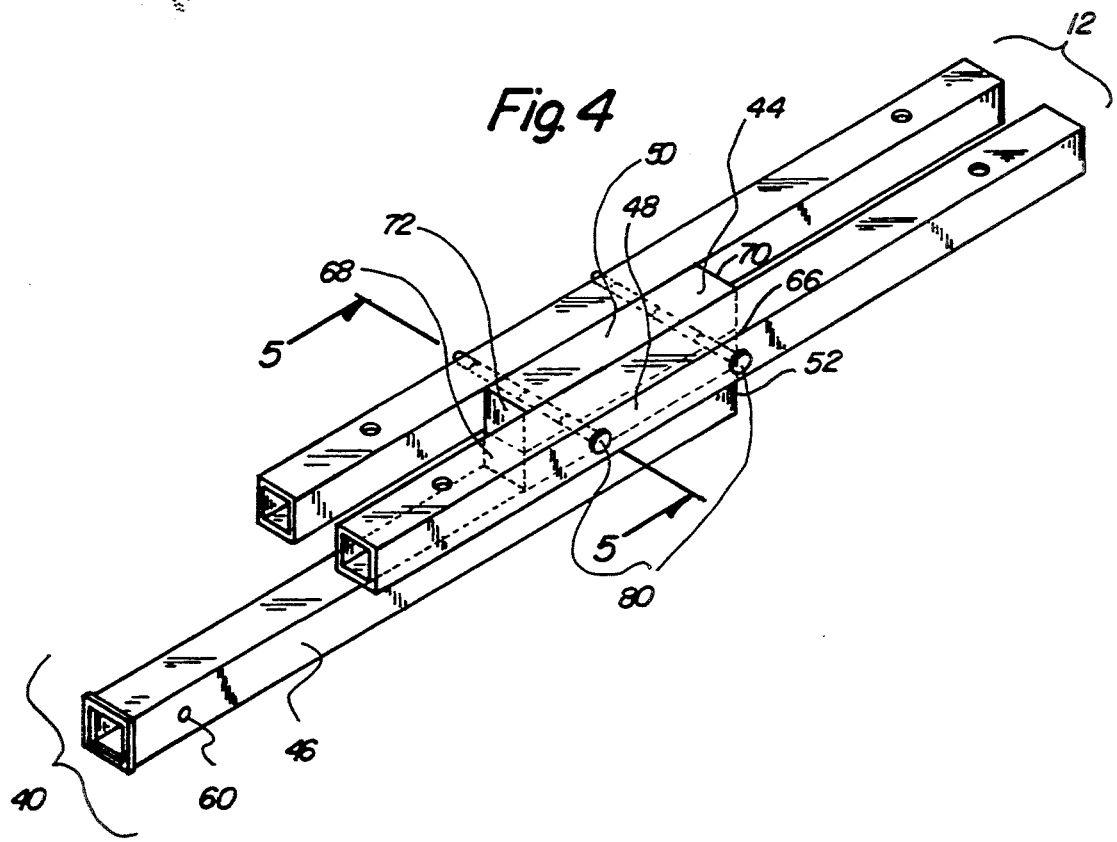

RETRACTABLE TRAILER HITCH RECEIVER APPARATUS

BACKGROUND OF THE INVENTION

1. Field of the Invention

The present invention relates to a retractable trailer hitch receiver apparatus and more particularly pertains to allowing a trailer hitch to be coupled to a vehicle in an extended operable configuration and hidden from view in a retracted stowed configuration with a retractable trailer hitch receiver apparatus.

2. Description of the Prior Art

The use of hitch assemblies is known in the prior art. More specifically, hitch assemblies heretofore devised and utilized for the purpose of coupling a hitch to a vehicle are known to consist basically of familiar, expected and obvious structural configurations, notwithstanding the myriad of designs encompassed by the crowded prior art which have been developed for the fulfillment of countless objectives and requirements.

By way of example, U.S. Pat. Des. No. 328,447 to Ahleen discloses a combined removable vehicular mud flap unit and hitch adapter. U.S. Pat. No. 3,889,978 to Kann discloses a removable gooseneck hitch. U.S. Pat. No. 4,824,134 to Harris discloses a portable fifth wheel hitch apparatus. U.S. Pat. No. 4,883,285 to Hohrman discloses a removable trailer hitch. U.S. Pat. No. 5,104,138 to Allen discloses a trailer hitch assembly with readily removable trailer hitch.

While these devices fulfill their respective, particular objective and requirements, the aforementioned patents do not describe a retractable trailer hitch receiver apparatus that allows a trailer hitch to be coupled to a vehicle in an extended operable configuration for towing a trailer and hidden from view in a retracted stowed configuration so as not to diminish the appearance of the vehicle.

In this respect, the retractable trailer hitch receiver apparatus according to the present invention substantially departs from the conventional concepts and designs of the prior art, and in doing so provides an apparatus primarily developed for the purpose of allowing a trailer hitch to be coupled to a vehicle in an extended operable configuration and hidden from view in a retracted stowed configuration.

Therefore, it can be appreciated that there exists a continuing need for new and improved retractable trailer hitch receiver apparatus which can be used for allowing a trailer hitch to be coupled to a vehicle in an extended operable configuration and hidden from view in a retracted stowed configuration. In this regard, the present invention substantially fulfills this need.

SUMMARY OF THE INVENTION

In the view of the foregoing disadvantages inherent in the known types of hitch assemblies now present in the prior art, the present invention provides an improved retractable trailer hitch receiver apparatus. As such, the general purpose of the present invention, which will be described subsequently in greater detail, is to provide a new and improved retractable trailer hitch receiver apparatus and method which has all the advantages of the prior art and none of the disadvantages.

To attain this, the present invention essentially comprises, in combination, a mounting frame adapted to be coupled directly beneath a vehicle and formed of a pair of spaced, parallel and horizontally aligned rigid tubes. Each tube has a square cross-section with a height of about $2\frac{1}{2}$ inches, a width of about $2\frac{1}{2}$ inches, a thickness of about $\frac{1}{2}$ inch, and a length of about 18 inches. Each tube has an open base end and an open tip end. Each tube has a pair of upwardly extended mounting holes disposed therethrough with each mounting hole adapted to receive a bolt for coupling each tube underneath a vehicle. Each tube includes a pair of spaced, parallel and horizontally aligned bores formed therethrough with each bore being circular in extent and having a diameter of about $\frac{3}{4}$ inch and with spacing between the bores being about $4\frac{1}{2}$ inches. The bores near the base ends of both tubes are aligned about a common horizontal axis, and the bores near the tip ends of both tubes aligned about a common horizontal axis. Two pairs of rigid elongated bolts are included. Each bolt of each pair is disposed through a separate mounting hole of the mounting frame. Each bolt is adapted for securing the mounting frame beneath a vehicle.

A L-shaped rigid hitch receiver is included and positionable between and in contact with the tubes of the mounting frame. The hitch receiver has a base leg and a cross leg with the base leg formed of a first tube and a cross leg formed of a second tube and a third tube. Each tube has a square cross-section with a height of about $2\frac{1}{2}$ inches, a width of about $2\frac{1}{2}$ inches, and a thickness of about $\frac{1}{4}$ inch. The first tube has a length of about $17\frac{1}{4}$ inches. The first tube further has a sealed base end and an open tip end adapted for receiving a trailer hitch therein. The tip end of the first tube includes a steel band coupled therearound defining a lip. The lip has a thickness of about $\frac{1}{4}$ inch and a width of about $\frac{3}{4}$ inch. The first tube further includes a receiver hole formed therethrough at a location about 3 inches from the tip end and a pair of spaced, parallel and horizontally aligned bores formed therethrough. Each bore of the first tube is circular in extent and has a diameter of about $\frac{3}{4}$ inch with spacing between the bores being about $4\frac{1}{2}$ inches. The receiver hole is separated from the nearest bore of the pair by a distance of about $4\frac{1}{2}$ inches.

The second tube of the cross leg has a sealed base end and a sealed tip end and a length less than that of the first tube. The second tube is integrally coupled upon and axially aligned with the first tube such that their base ends are aligned. The third tube of the cross leg has a sealed base end and a sealed tip end and a length equal to that of the second tube. The third tube is integrally coupled upon and axially aligned with the second tube such that their base ends and tip ends are aligned. The third tube further has a pair of spaced, parallel and horizontally aligned bores disposed therethrough with the bore near the tip end positioned directly above the bore near the tip end of the first tube.

Lastly, a pair of rigid elongated pins is included. Each pin is disposable through and securable within a separate bore of the base leg of the hitch receiver and through a separate pair of aligned bores of the mounting frame for placing the hitch receiver in a retracted stowed configuration with the base leg of the hitch receiver planarly aligned and flush with the mounting frame. Each pin is further disposable through and securable within a separate bore of the cross leg of the hitch receiver and through a separate pair of aligned bores of the mounting frame for placing the hitch receiver in an extended operable configuration for receipt of a trailer hitch.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved retractable trailer hitch receiver apparatus which has all the advantages of the prior art hitch assemblies and none of the disadvantages.

It is another object of the present invention to provide a new and improved retractable trailer hitch receiver apparatus which may be easily and efficiently manufactured and marketed.

It is a further object of the present invention to provide a new and improved retractable trailer hitch receiver apparatus which is of durable and reliable construction.

An even further object of the present invention is to provide a new and improved retractable trailer hitch receiver apparatus which is susceptible of a low cost of manufacture with regard to both materials and labor, and which accordingly is then susceptible of low prices of sale to the consuming public, thereby making such a retractable trailer hitch receiver apparatus economically available to the buying public.

Still yet another object of the present invention is to provide a new and improved retractable trailer hitch receiver apparatus which provides in the apparatuses and methods of the prior art some of the advantages thereof, while simultaneously overcoming some of the disadvantages normally associated therewith.

Even still another object of the present invention is to provide a new and improved retractable trailer hitch receiver apparatus for allowing a trailer hitch to be coupled to a vehicle in an extended operable configuration and hidden from view in a retracted stowed configuration.

Lastly, it is an object of the present invention to provide a new and improved retractable trailer hitch receiver apparatus comprising a mounting frame formed of a pair of spaced, elongated, rigid and generally horizontal elements; frame coupling means for coupling the mounting frame beneath a vehicle; a rigid hitch receiver positionable between the elements of the frame and formed of a generally horizontal base leg and a cross leg extended upwards therefrom and with an end of the base leg adapted to be coupled to a trailer hitch; and securement means having one mode for coupling the base leg of the hitch receiver to the mounting frame for placing the hitch receiver in a retracted stowed configuration such that the base leg of the hitch receiver is generally aligned with the mounting frame and another mode for coupling the cross leg to the mounting frame for placing the hitch receiver in an extended operable configuration for receipt of a trailer hitch.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of the present invention shown decoupled from a vehicle and positioned in a retracted stowed configuration.

FIG. 4 is a perspective view of the present invention shown decoupled from a vehicle and positioned in an extended operable configuration.

The same reference numerals refer to the same parts through the various Figures.

DESCRIPTION OF THE PREFERRED EMBODIMENT

Figure 1:
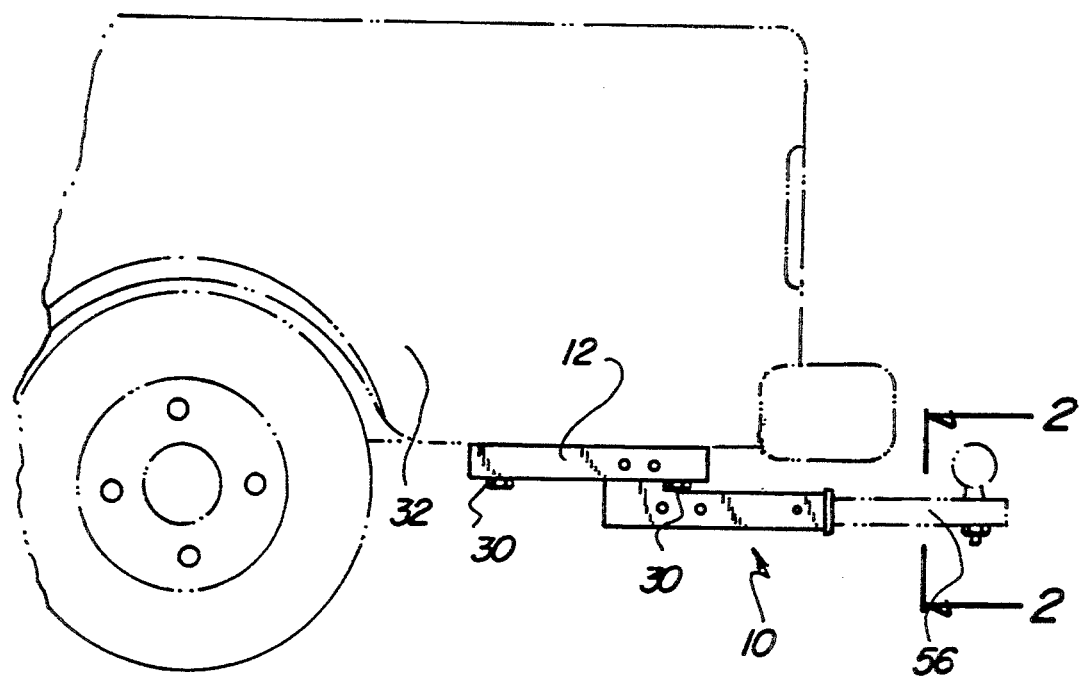
FIG. 1 is a side-elevational view of the preferred embodiment constructed in accordance with the principles of the present invention coupled to a vehicle in an extended operable configuration.
Figure 2:
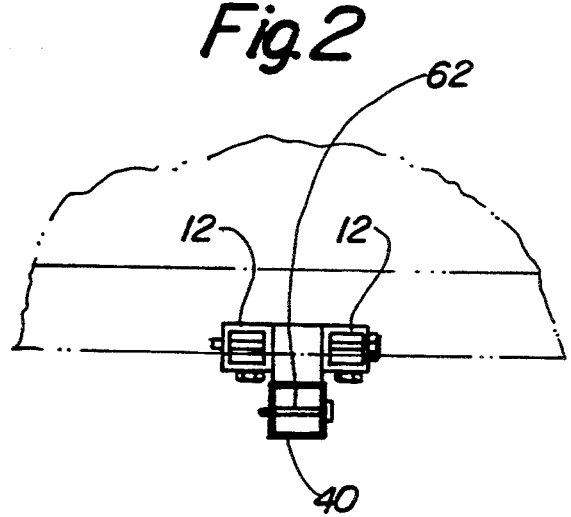
FIG. 2 is a side-elevational view of the present invention taken along the line 2—2 of FIG. 1.
Figure 5:
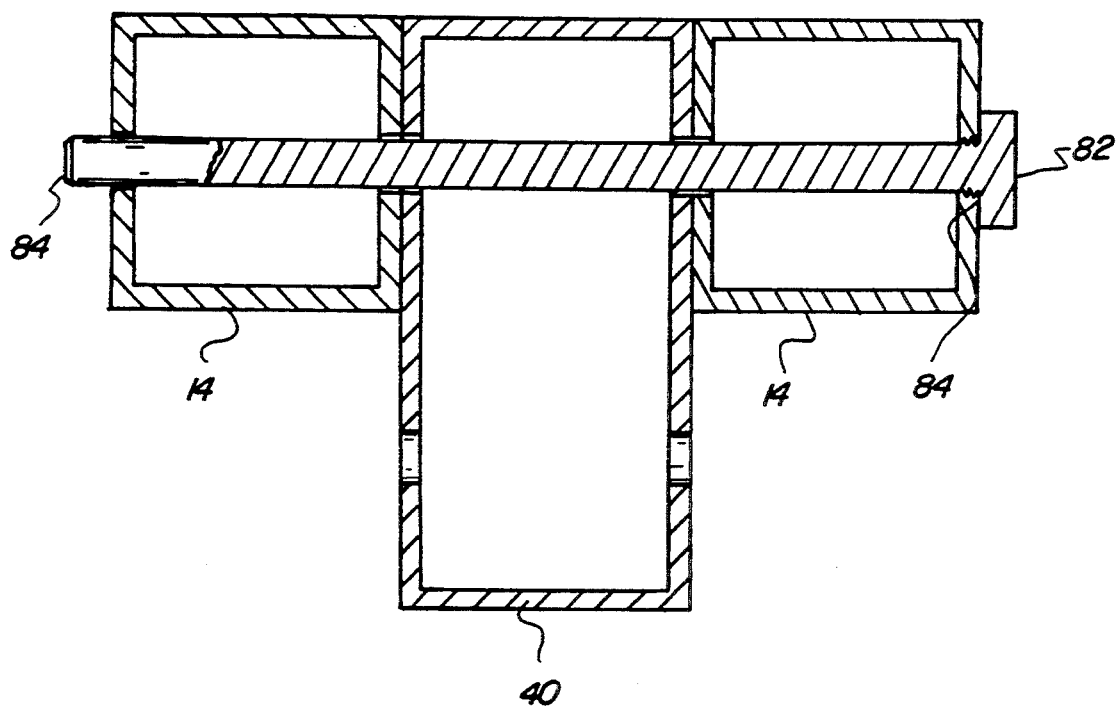
FIG. 5 is a cross-sectional view of the present invention taken along the line 5—5 of FIG. 4.
Figure 6:
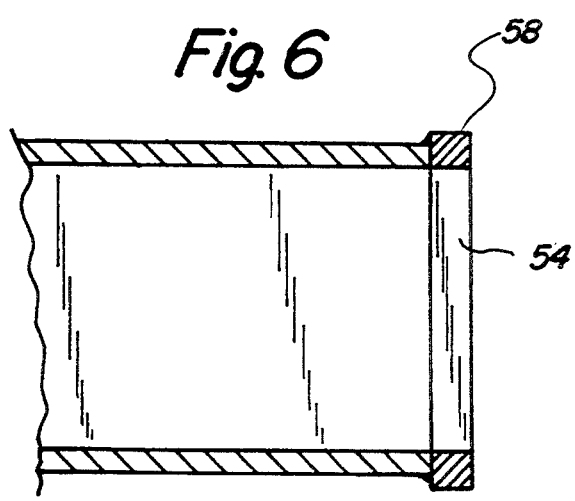
FIG. 6 is a cross-sectional view of the present invention taken along the line 6—6 of FIG. 3.

With reference now to the drawings, and in particular, to FIG. 1 thereof, the preferred embodiment of the new and improved retractable trailer hitch receiver apparatus embodying the principles and concepts of the present invention and generally designated by the reference number 10 will be described.

Specifically, the present invention includes four major components. The major components are the mounting frame, bolts, hitch receiver, and pins. These components are interrelated to provide the intended function.

More specifically, it will be noted in the various Figures that the first major component is the mounting frame 12. The mounting frame is formed with a pair of spaced, parallel, and horizontally aligned rigid tubes 14. Each tube has a square cross-section with a height of about 2½ inches, a width of about 2½ inches, a thickness of about ½ inch and a length of about 18 inches. Each tube further has an open base end 16 and an open tip end 18. Each tube has a pair of upwardly extended mounting holes 20 disposed therethrough. Each mounting hole is adapted to receive a bolt for coupling each tube underneath a vehicle such that they are aligned in parallel with a forward direction of travel for the vehicle. Each tube includes a pair of spaced, parallel, and horizontally aligned bores 22 formed therethrough. Each bore is circular in extent and has a diameter of about ¾ inch. The spacing between the bores is about 4½ inches. The bores near the base ends of both tubes are aligned about a common horizontal axis of symmetry. The bores near the tip ends of both tubes are aligned about a common horizontal axis of symmetry.

The second major component is the bolts 30. The present invention includes two pairs of rigid and elongated bolts. Each bolt of each pair is disposed through a separate mounting hole 20 of the mounting frame. Each bolt is extended upwards and adapted for securing the mounting frame beneath a vehicle 32.

The third major component is the hitch receiver 40. The hitch receiver is L-shaped and rigid in structure. It is positionable between and in contact with the tubes 14 of the mounting frame. The hitch receiver has a base leg 42 and a cross leg 44. The base leg is formed of a first tube 46. The cross leg is formed of a second tube 48 integrally coupled with a third tube 50. Each tube has a square cross-section with a height of about 2½ inches, a width of about 2½ inches, and a thickness of about ¼ inch. The first tube has a length of about 17¼ inches. The first tube further has a sealed base end 52 and an open tip end 54. The tip end is adapted for receiving a trailer hitch 56 therein. The tip end further includes a steel band coupled therearound defining a lip 58. The lip has a thickness of about ¼ inch and a width of about ¾ inch. The lip adds further rigidity and strength to the tip end of the base leg for coupling with a trailer hitch. The first tube includes a receiver hole 60 formed therethrough at a location about 3 inches in from the tip end. The receiver hole is adapted to receive a hitch pin 62 for coupling a trailer hitch within the base leg. The first tube also includes a pair of spaced, parallel, and horizontally aligned bores 64 formed therethrough. Each bore is circular in extent and has a diameter of about ¾ inch. The spacing between the bores being about 4½ inches. The receiver hole is separated from the nearest bore of the pair by a distance of about 4½ inches.

The second tube of the cross leg has a sealed base end 66 and a sealed tip end 68. The second tube has a length less than that of the first tube. The second tube is integrally coupled upon and axially aligned with the first tube such that their base ends are aligned. The third tube of the cross leg has a sealed base end 70 and a sealed tip end 72. The third tube has a length equal to that of the second tube. The third tube is integrally coupled upon and axially aligned with the second tube such that their base ends and tip ends are aligned. The third tube further includes a pair of spaced, parallel, and horizontally aligned bores 74 disposed therethrough.

The bore near the tip end 72 is positioned directly above the bore near the base end of the first tube. Although in the preferred embodiment the hitch receiver is formed of three tubes, it may also be fashioned as one integral element provided the essential structure remains intact. Furthermore, the dimensions as noted for the mounting frame and hitch receiver may be adjusted accordingly as long as their relative ratios remain essentially the same. The advantages of the present invention are in the overall structure of the elements as opposed to their specific dimensional extents.

The fourth major component is the pins 80. The present invention includes a pair of pins. The pins are rigid and elongated in structure. Each pin has a head 82 on one end and a tip 84 on the other end. A threaded portion 86 is formed near each head to enhance its gripping action when coupled within a recipient bore. Each pin is disposable through and securable within a separate bore 64 of the base leg of the hitch receiver and through a separate pair of aligned bores 22 of the mounting frame. With the pins in place in this fashion, the hitch receiver is positioned in a retracted stowed configuration with the base leg of the hitch receiver planarly aligned and flush with the mounting frame. See FIG. 3. Thus, the present invention may be hidden from view when not in use. This enhances the appearance of the vehicle upon which the present invention resides. Each pin is further disposable through and securable within a separate bore 74 of the cross leg of the hitch receiver and through a separate pair of aligned bores 22 of the mounting frame. With the pins in place in this fashion, the hitch receiver is placed in an extended operable configuration for receipt of a trailer hitch for pulling a trailer. See FIG. 4.

Occasionally, many drivers would like to pull a trailer behind their vehicle, but they don't want to have a trailer hitch permanently attached to their vehicle. This is because some people don't like the way the back of the vehicle looks with a hitch permanently attached to it. The present invention is a new type of hitch with a unique design which allows the owner to fasten it to the frame of the vehicle and slide the hitch out of sight beneath the frame when it is not needed.

The present invention consists of several pieces of square steel tubing, a steel band, grade 8 bolts, and two 4140 stress-proof steel pins ¾ inches in diameter and 9½ inches long. The device is made in two pieces: a mounting frame and a hitch receiver. The mounting frame is made from two pieces of 2½ inches square × ¼ inch thick tubing, each approximately 18 inches long. The two pieces of the tubing each have two ¾ inch holes drilled in them 4½ inches apart. The tubes of the mounting from are placed parallel to each other about 2½ to 3 inches apart. Once it is assembled, the mounting frame is attached to the two frame rails beneath a vehicle's rear. The mounting frame is bolted to a vehicle with grade 8 bolts.

The hitch receiver of the present invention is made from an L-shaped piece of tubing with one horizontal base leg about 17¼ inches long and a cross leg 7½ inches high (including the base leg portion thereunder). A ¾ inch by ¼ inch steel band is welded to the end of the base leg. A standard receiver size hole is also drilled through the base leg approximately 3 inches in from the end. A pair of ¾ inch holes 4½ inches apart are drilled in the base leg and in the cross leg. The ¾ inch holes in the hitch receiver and in the mounting frame hold the steel pins.

The present invention is easy to use. Attach the mounting frame to the vehicle's frame in the rear of the vehicle. Slide the hitch in between the two parallel pieces of tubing. If the owner wants to use the hitch, then the hitch should be slid in so that the ¾ inch holes in the cross leg line up with those in the mounting frame. If the hitch is not needed, then it should be slid in so that the ¾ inch holes in the base leg lined up with those in the mounting frame. In this position, the hitch will not be visible on the rear of the vehicle. Once the hitch is in position, insert a hitch pin through the ¾ inch hitch receiver hole in the hitch receiver. This will hold the hitch securely in place. The present invention can be used on any vehicle that does not have a fuel tank or spare tire mounted beneath and behind the rear axle. It provides the owner with the convenience of a hitch which is only visible when it is needed.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A retractable trailer hitch receiver apparatus for allowing a trailer hitch to be coupled to a vehicle in an extended operable configuration and hidden from view in a retracted stowed configuration comprising, in combination:

a mounting frame formed of a pair of spaced, parallel and horizontally aligned rigid tubes, each tube having a square cross-section with a height of about 2½ inches, a width of about 2½ inches, a thickness of about ½ inch, and a length of about 18 inches, each tube further having an open base end and an open tip end, each tube having a pair of upwardly extended mounting holes disposed therethrough with each mounting hole adapted to receive a bolt for coupling each tube underneath a vehicle, each tube including a pair of spaced, parallel and horizontally aligned bores formed therethrough with each bore being circular in extent and having a diameter of about ¾ inch and with spacing between the bores being about 4½ inches, the bores near the base ends of both tubes aligned about a common horizontal axis and the bores near the tip ends of both tubes aligned about a common horizontal axis;

two pairs of rigid elongated bolts, each bolt of each pair disposed through a separate mounting hole of the mounting frame with each bolt adapted for securing the mounting frame beneath a vehicle;

a L-shaped rigid hitch receiver positionable between and in contact with the tubes of the mounting frame, the hitch receiver having a base leg and a cross leg with the base leg formed of a first tube and a cross leg formed of a second tube and a third tube, each tube having a square cross-section with a height of about 2½ inches, a width of about 2½ inches, and a thickness of about ¼ inch, the first tube having a length of about 17¼ inches, the first tube further having a sealed base end and an open tip end adapted for receiving a trailer hitch therein, the tip end thereof including a steel band coupled therearound defining a lip with the lip has a thickness of about ¼ inch and a width of about ¾ inch, the first tube further including a receiver hole formed therethrough at a location about 3 inches from the tip end and a pair of spaced, parallel and horizontally aligned bores formed therethrough, each bore being circular in extent and having a diameter of about ¾ inch with spacing between the bores being about 4½ inches, the receiver hole being separated from the nearest bore of the pair by a distance of about 4½ inches, the second tube having a sealed base end and a sealed tip end and a length less than that of the first tube, the second tube integrally coupled upon and axially aligned with the first tube such that their base ends are aligned, and the third tube having a sealed base end and a sealed tip end and a length equal to that of the second tube, the third tube integrally coupled upon and axially aligned with the second tube such that their base ends and tip ends are aligned, the third tube further having a pair of spaced, parallel and horizontally aligned bores disposed therethrough with the bore near the tip end positioned directly above the bore near the base end of the first tube; and a pair of rigid elongated pins, each pin disposable through and securable within a separate bore of the base leg of the hitch receiver and through a separate pair of aligned bores of the mounting frame for placing the hitch receiver in a retracted stowed configuration with the base leg of the hitch receiver planarly aligned and flush with the mounting frame, each pin further disposable through and securable within a separate bore of the cross leg of the hitch receiver and through a separate pair of aligned bores of the mounting frame for placing the hitch receiver in an extended operable configuration for receipt of a trailer hitch.

2. A retractable trailer hitch receiver apparatus comprising:

a mounting frame formed of a pair of spaced, elongated, rigid and generally horizontal elements;

frame coupling means for coupling the mounting frame beneath a vehicle;

a rigid hitch receiver positionable between the elements of the frame and formed of a generally horizontal base leg and a cross leg extended upwards therefrom and with an end of the base leg adapted to be coupled to a trailer hitch; and a plurality of pins, each pin disposable through and securable within the base leg of the hitch receiver and elements of the mounting frame for placing the hitch receiver in a retracted stowed configuration, each pin further disposable through and securable within the cross leg of the hitch receiver and elements of the mounting frame for placing the hitch receiver in an extended operable configuration.

* * * * *